United States Patent
Perotto et al.

[19]

[11] Patent Number: 6,029,994
[45] Date of Patent: Feb. 29, 2000

[54] INTEGRAL TUBULAR GENERATOR FOR INFLATING PROTECTIVE CUSHIONS

[75] Inventors: Christian Perotto, Ballancourt; Daniel Duvacquier, Bordeaux; Benoît Marsaud, Neaufles Saint Martin, all of France

[73] Assignee: Livbag S.N.C., Vert Le Petit, France

[21] Appl. No.: 08/993,860

[22] Filed: Dec. 18, 1997

[30] Foreign Application Priority Data

Dec. 18, 1996 [FR] France ................................. 96 15573

[51] Int. Cl.⁷ .................................................. B60R 21/26
[52] U.S. Cl. ........................................... 280/736; 280/741
[58] Field of Search .................... 280/736, 741, 280/737, 742; 102/530, 531

[56] References Cited

U.S. PATENT DOCUMENTS

| | | |
|---|---|---|
| 3,813,007 | 5/1974 | Doin et al. . |
| 3,882,673 | 5/1975 | Doin et al. . |
| 4,094,248 | 6/1978 | Jacobson ................................ 102/288 |
| 4,846,368 | 7/1989 | Goetz ......................................... 222/3 |
| 5,022,674 | 6/1991 | Frantom et al. ......................... 280/741 |
| 5,112,079 | 5/1992 | Haland et al. . |
| 5,160,163 | 11/1992 | Castagner et al. . |
| 5,482,315 | 1/1996 | Chandler et al. ....................... 280/736 |
| 5,525,171 | 6/1996 | Finck et al. . |
| 5,610,444 | 3/1997 | Austruy et al. . |
| 5,611,566 | 3/1997 | Simon et al. . |
| 5,638,104 | 6/1997 | Suzuki et al. ........................... 347/171 |
| 5,763,817 | 6/1998 | Renfroe et al. ......................... 280/736 |
| 5,799,973 | 9/1998 | Bauer et al. ............................. 280/741 |
| 5,804,758 | 9/1998 | Marsaud et al. ........................ 280/741 |

FOREIGN PATENT DOCUMENTS

| | | |
|---|---|---|
| 404 572 | 12/1990 | European Pat. Off. . |
| 686 530 | 12/1995 | European Pat. Off. . |
| 42 27 547 | 2/1994 | Germany . |
| 195 48 266 | 6/1997 | Germany . |
| 90/05651 | 5/1990 | WIPO . |

*Primary Examiner*—Paul N. Dickson
*Attorney, Agent, or Firm*—Pillsbury Madison & Sutro, LLP

[57] ABSTRACT

The invention relates to a pyrotechnic generator of hot gases (1) and to a process for its manufacture. The generator is in the form of a cylindrical tube (2) which comprises a side wall (3) the length (L) of the generatrices of which is at least two times greater than its external diameter (D), the said tube (2) being made up of two parts, an upstream part (4) including especially an ignition system and a pyrotechnic charge (14), and a downstream part (5) forming a diffuser (22). The process of manufacture consists in inserting and fixing a nozzle (17) into the tube (2) and then successively introducing a filtering grid (16), an enclosure (12), a wedging ring (11), the ignition system and a leakproof plug (21). The invention makes it possible to produce a generator intended to inflate a cushion for protecting the occupants of a motor vehicle.

13 Claims, 4 Drawing Sheets

INTEGRAL TUBULAR GENERATOR FOR INFLATING PROTECTIVE CUSHIONS

The present invention relates to the field of protection, in the event of collision, of the occupants of a motor vehicle by means of a protective cushion inflated with gases originating from a pyrotechnic gas generator. More precisely, the invention relates to a pyrotechnic generator of hot gases, usable for inflating both a front cushion and a side cushion for protecting the occupants of a motor vehicle.

It has thus been proposed to protect, in the event of front impacts, the occupants, driver and passengers, of a motor vehicle by means of inflatable cushions placed before them. Patents FR 2 116 948 and FR 2 116 949, corresponding to U.S. Pat. No. 3,882,673 and U.S. Pat. No. 3,813,007, have described pyrotechnic gas generators in which the gases originate partly from the combustion of a pyrotechnic gas charge and partly from the vaporization of a liquid contained in an enclosure placed in proximity to the said pyrotechnic charge. However, such generators have a relatively complex structure which makes their cost price high. People skilled in the art have therefore turned towards generators in which all of the gases originated from the combustion of a solid charge. Thus, American U.S. Pat. No. 5,160,163 proposes a pyrotechnic gas generator, of cylindrical overall shape, more especially conceived for the protection of a driver of a motor vehicle, and European Patent EP 404 572 proposes a pyrotechnic gas generator of elongate cylindrical overall shape, more especially conceived for the protection of the passenger situated at the front of a motor vehicle. However, both these generators have a complex mechanical configuration, therefore entailing a relatively high cost of manufacture. In addition, they cannot be employed for inflating side protection cushions.

More recently, people skilled in the art have been concerned with the problem of the protection by an inflatable cushion of the occupants of a motor vehicle in the event of side impacts and no longer front ones. This problem, and its solution by means of side cushions placed in the back rest of the vehicle seats is evoked, for example, in American U.S. Pat. No. 5,112,079. Since then it has unfortunately turned out that the traditional pyrotechnic generators for front cushions are absolutely unsuitable for ensuring a correct and reliable inflation of the protective side cushions. In fact, whereas, to be reliable, a front protective cushion must be capable of being inflated within a time interval close to 50 milliseconds after the detection of the impact and hence requires a pyrotechnic charge which burns completely within this time interval, a protective side cushion must be capable of being inflated within a time interval close to 10 milliseconds after the detection of the impact. However, with the hitherto known solutions in the case of the front cushions, a person skilled in the art does not have available a generator and a pyrotechnic charge which guarantee a complete combustion within a time interval of 10 milliseconds. In fact, generators with a storage vessel of liquid or generators in which the charge is in the form of a solid block intrinsically have response times which are too long. The generators in which the charge consists of a bundle of hollow strands of gasgenerating powder do not make it possible to guarantee, in the pressure and temperature conditions required for such a fast combustion, the mechanical strength of the bundle and hence the reliability of the response of the generator. Finally, generators in which the pyrotechnic composition is in the form of grains of powder or of tablets do not allow the combustion law to be controlled and, with solutions of this type, a person skilled in the art is not sheltered from risks of explosion of the generator.

People skilled in the art are therefore searching for pyrotechnic gas generators with low costs of manufacture, which guarantee a reliable inflation both of front cushions and of side cushions for protecting the occupants of a motor vehicle.

The objective of the present invention is, on the one hand, to propose a pyrotechnic gas generator the manufacture of which is easy and relatively low in cost, which guarantees, according to the geometry of the pyrotechnic charge employed, either a complete combustion law within a time of the order of 50 milliseconds during front impacts, or a complete combustion law within a time of the order of 10 milliseconds during side impacts and, on the other hand, to propose a process for its manufacture.

The invention therefore relates to a pyrotechnic generator of hot gases, intended for motor vehicle safety, comprising especially a cylindrical tube which has a side wall the length of the generatrices of which is at least two times greater than its external diameter, an igniter and a pyrotechnic charge, characterized in that i) the said cylindrical tube is made of metal, this metal being sufficiently ductile to be capable of being crimped, this tube comprising a continuous upstream part and a downstream part provided with holes, and having an upstream open end and a downstream open end, ii) an inner nozzle consists of a cylindrical component which has an initially shut off central orifice, this component being fixed by crimping into the side wall at the junction of the upstream part and of the downstream part of the tube, iii) the said pyrotechnic charge is placed in the upstream part and isolated from the continuous side wall of the tube by a cylindrical enclosure, iv) the said igniter is inserted into an ignitercarrier fixed in the upstream open end of the tube, v) a leakproof plug is fixed in the downstream open end of the tube.

The metal of which the cylindrical tube consists preferably has an extensibility greater than 20% of its length and a tensile strength greater than 400 MPa.

More particularly, the downstream part of the tube forms a diffuser included between the nozzle which is shut off and the leakproof plug fixed in the downstream open end.

The central orifice of the inner nozzle is preferably shut off by a burstable cover.

A grid for filtering and supporting the pyrotechnic charge is advantageously placed between the cylindrical enclosure and the inner nozzle.

Also advantageously, a wedging ring is placed between the igniter-carrier and the cylindrical enclosure so as to wedge the said enclosure against the filtering grid. If need be, this ring can also fulfill a function of a volume compensator.

According to a first preferred embodiment the pyrotechnic charge consists of a pyrotechnic composition chosen from the group consisting of compositions based on nitrocellulose and nitroglycerine. The composition preferably includes at least 30% of nitroglycerine by weight in the mixture of nitrocellulose and of nitroglycerine.

According to a second preferred embodiment the pyrotechnic charge consists of a plastic-bonded pyrotechnic composition based on an organic binder and on at least one oxidizing filler. Among these, two compositions are particularly preferred:

a first one, including essentially a silicone resin as binder and a mixture of ammonium perchlorate and sodium nitrate as oxidizing filler, which is described, for example, in Patent Application FR-A-2 728 562, a second one, including a thermoplastic binder and an oxidizing filler based on ammonium nitrate, which is, for example, proposed in Patent Application FR-A-2 713 632.

According to a particular embodiment the pyrotechnic charge is in the form of a block perforated with a plurality of channels which are parallel to the axis of the said block contained in the enclosure which is itself placed between the wedging ring and the filtering grid, so that the said channels are parallel to the axis of revolution of the tube.

The block of pyrotechnic charge preferably has radial webs to be burnt which are all identical, with a geometry permitting a simultaneous ignition by the inner surfaces of the said channels and by the outer side surface of the block.

In the same plane transverse to the block the centres of the peripheral channels of the block are advantageously not all equidistant from the centre of the said block, but are distributed alternately, in this plane, on two different concentric circles.

The said channels are also preferably cylindrical channels.

The invention also relates to a process for the manufacture of such a pyrotechnic generator of hot gases, a process characterized in that i) in a first stage a cylindrical tube is made of a metal which is sufficiently ductile to be capable of being crimped, this tube comprising
   a continuous upstream part, a downstream part provided with holes, an upstream open end and
   a downstream open end, and having a side wall the length of the generatrices of which is at least two times greater than its external diameter, ii) in a second stage an inner nozzle consisting of a cylindrical component which has a central orifice is introduced through one of the open ends of the said tube, iii) in a third stage the nozzle is fixed by crimping into the side wall of the tube, at the junction of the upstream part and of the downstream part of the tube, iv) in a fourth stage a cylindrical enclosure containing the pyrotechnic charge as well as the wedging ring and the filtering grid are introduced into the tube through the upstream open end, v) in a fifth stage an igniter inserted into an igniter-carrier is introduced through the upstream open end, the said igniter-carrier abutting against the wedging ring and being fixed in the upstream open end of the said tube.

A leakproof plug is preferably fixed in the downstream open end of the tube.

Depending on the case, the said cylindrical enclosure is:

either a tubular enclosure containing only the pyrotechnic charge, the wedging ring being placed flat against an open end of the said tubular enclosure and the filtering grid being placed flat against the other open end, the nozzle being then shut off by a burstable cover, or a cylindrical casing containing the pyrotechnic charge and the wedging ring and the filtering grid, the said casing comprising a closed end placed flat against the nozzle and being used as a burstable cover.

The fixing of the igniter-carrier in the upstream open end of the tube is preferably carried out by crimping.

Also preferably, the fixing of the leakproof plug in the downstream open end of the tube is carried out by crimping.

A generator according to the invention therefore has the following two advantages:

on the one hand the metal chosen to form the cylindrical tube permits a process of manufacture which makes use of only a small number of components, which makes it possible to reduce very appreciably the cost of manufacture of a generator according to the invention, while guaranteeing a correct and reliable inflation of the cushion for protecting the occupants of a motor vehicle, on the other hand this generator is capable of being employed in all the possible configurations, that is to say both in the "driver" configuration and in the "passenger" configuration, and, according to the geometry of the pyrotechnic charge employed, it can be used to inflate either a protective front cushion or a side cushion for protecting the occupants of a motor vehicle.

A detailed description of the preferred embodiment of the invention is given below with reference to FIGS. 1 to 3.

Figure 1:
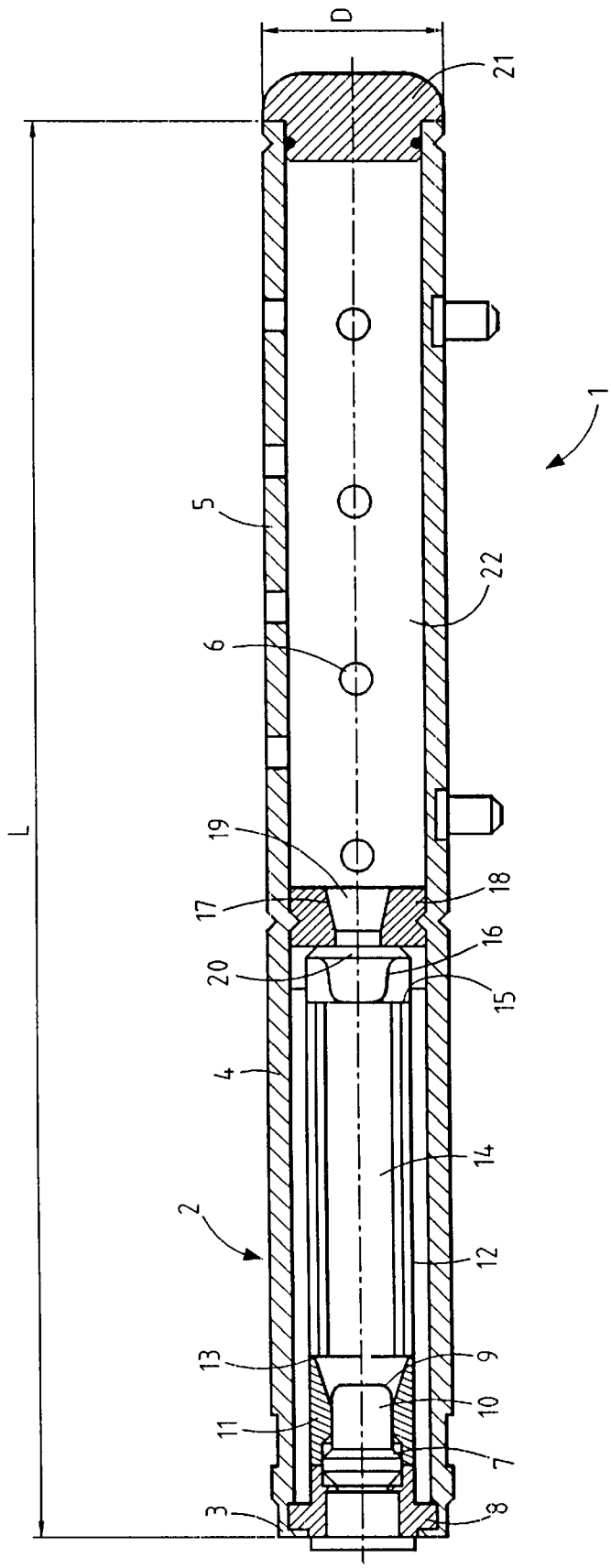
FIG. 1 is a lengthwise section of a generator according to the invention, employed for inflating a protective side cushion.

Referring more particularly to FIG. 1, we note that a pyrotechnic generator of hot gases 1 according to the invention, employed for inflating a protective side cushion comprises a cylindrical tube 2 made of a metal which is sufficiently ductile to be capable of being crimped, that is to say that the metal must preferably have an extensibility greater than 20% of its length and a tensile strength greater than 400 MPa. This tube 2 has two openings, each placed at one of its upstream and downstream ends, and consists of a side wall 3 which comprises a continuous upstream part 4 and a downstream part 5 provided with holes 6. The length L of the generatrices of the said side wall 3, which must be at least two times greater than its external diameter D, is substantially equal to eight times this diameter D in the example shown in FIG. 1. An igniter 7 is carried by an igniter-carrier 8 which is fixed by crimping in the upstream open end of the tube 2. The igniter 7 may be a percussion igniter or an electrical igniter as shown in the figures. The igniter 7 is surrounded by a fragmentable metal cap 9 containing an igniting powder 10 like, for example, a powder of the boron/potassium nitrate type. A wedging ring 11 made of aluminium is placed between the igniter-carrier 8 and a cylindrical tubular enclosure 12 made of aluminium, the said ring 11 being pressed against one end 13 of the tubular enclosure 12. This tubular enclosure 12 contains a pyrotechnic charge 14 and its other end 15 is laid flat against a filtering grid 16 in the form of a cylindrical dish, itself abutting against an inner nozzle 17. This inner nozzle 17 consists of a cylindrical component 18 made of stainless steel which has a central orifice 19 closed by a burstable cover 20. The nozzle 17 is fixed by crimping in the side wall 3 at the junction of the upstream part 4 and of the downstream part 5 of the tube 2. A leakproof plug 21 is crimped in the downstream open end of the tube 2, and makes it possible to form a diffuser 22 with the aid of the covered nozzle 17 and of the downstream part 5 provided with holes 6. The pyrotechnic charge 14 is preferably chosen either from so-called "double-base" compositions including at least 30% of nitroglycerine by weight in the mixture of nitroglycerine and nitrocellulose, or from the following two types of plasticbonded pyrotechnic compositions:

compositions including essentially a silicone resin as binder and a mixture of ammonium perchlorate and sodium nitrate as oxidizing filler, compositions including a thermoplastic binder and an oxidizing filler based on ammonium nitrate.

The so-called "double-base" compositions have a disadvantage which consists in their deteriorating in the course of time in contact with an iron-containing material. For this reason the pyrotechnic charge 14 is contained in a cylindrical tubular enclosure 12 made of aluminium, the open ends of which 13 and 15 bear, on the one hand, against the wedging ring 11 and, on the other hand, against the filtering grid 16. Any direct contact between, on the one hand, the tube 2, the wedging ring 11, the filtering grid 16 and the pyrotechnic composition, on the other hand, is then prevented, thereby ensuring a correct and reliable combustion of the pyrotechnic charge 14.

On the other hand, when the pyrotechnic charge 14 is in the form of a plastic-bonded pyrotechnic composition, the cylindrical tubular enclosure 12 made of aluminium, which contains the said pyrotechnic charge 14, enables a sufficient pressure to be maintained in the upstream part 4 to guarantee the ignition and the complete combustion of the pyrotechnic charge 14.

Figure 2:
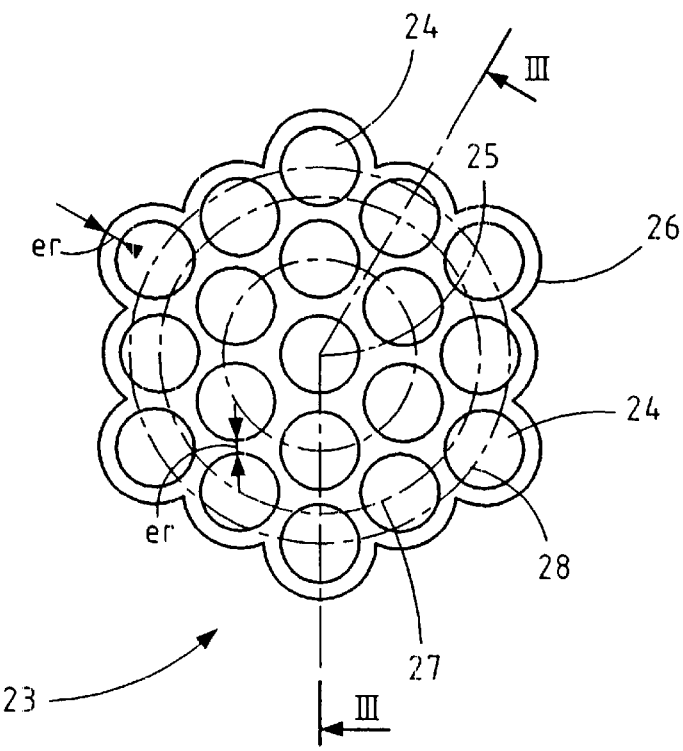
FIG. 2 is a front view of a block constituting the pyrotechnic charge of the generator shown in FIG. 1.
Figure 3:
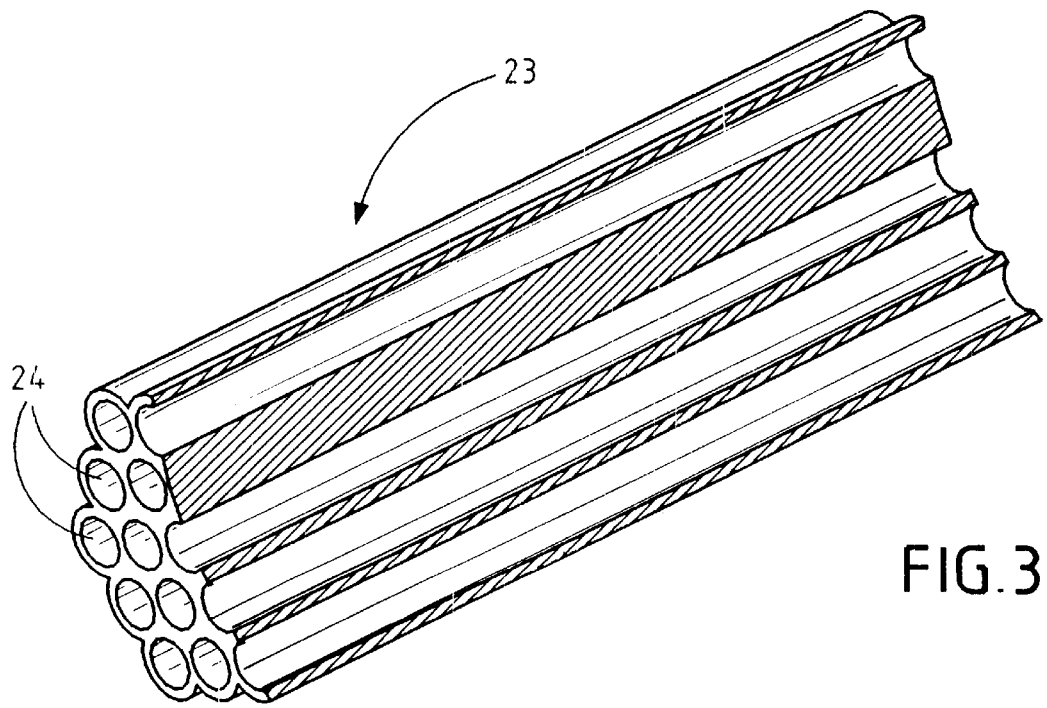
FIG. 3 is a view in perspective, partially exploded, along a plane of the broken section III—III of the block shown in FIG. 2.

The use of a generator according to the invention for inflating a protective side cushion requires a special geometry of the pyrotechnic charge 14. Referring more particularly to FIGS. 2 and 3, we note that the charge 14 is in the form of a block 23 perforated with a plurality of channels 24 which are parallel to the axis 25 of the said block 23 contained in the tubular enclosure 12, the open ends 13 and 15 of which bear respectively against the wedging ring 11 and the filtering grid 16, so as to make the said channels 24 parallel to the axis of revolution of the tube 2. In order to guarantee a complete reliability of the combustion law, the pyrotechnic charge block 23 has radial webs "$e_r$" to be burnt which are all identical, with a geometry permitting a simultaneous ignition by the inner surfaces of the said channels 24 and by the outer side surface 26 of the block 23. When seen in a plane transverse to the block 23, the centres of the peripheral channels are preferably not all equidistant from the centre 25 of the said block 23, but are distributed alternately, in this plane, on two circles 27 and 28 which are concentric but different. The said channels 24 are also preferably cylindrical channels.

Figure 4:
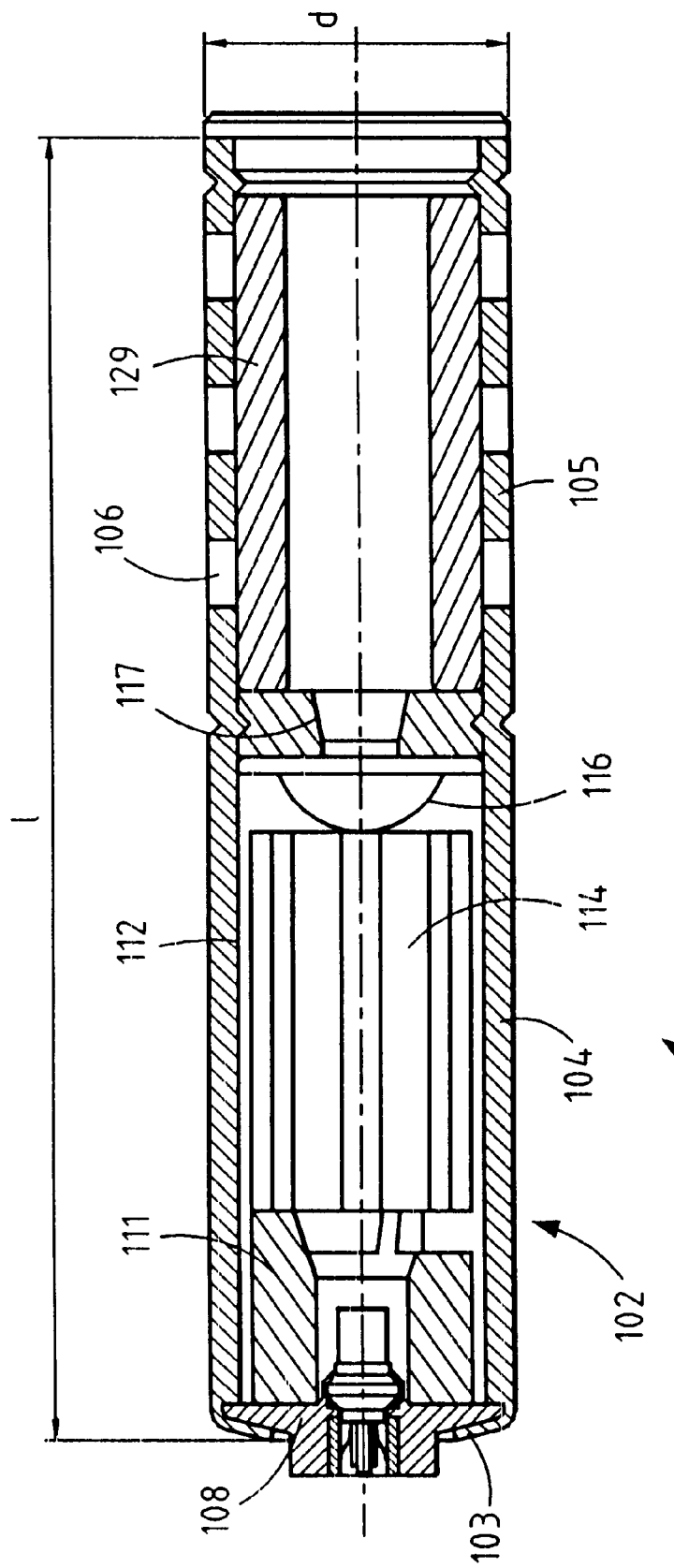
FIG. 4 is a lengthwise section of a generator according to the invention, employed for inflating a protective front cushion.
Figure 5:
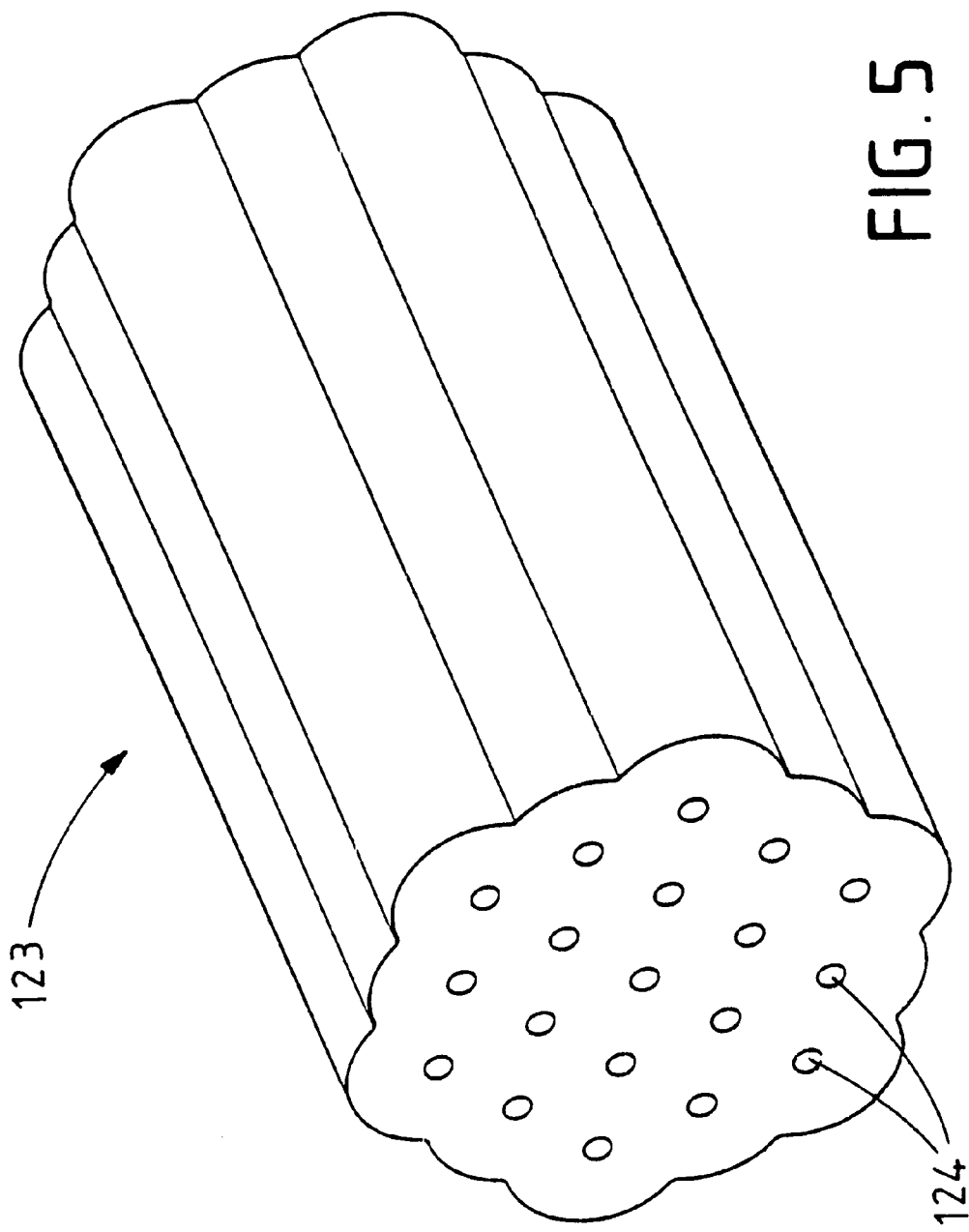
FIG. 5 is a perspective view of a block constituting the pyrotechnic charge of the generator shown in FIG. 4.

Referring more particularly to FIG. 4, we note that a pyrotechnic generator of hot gases 101 according to the invention, employed for inflating a protective front cushion comprises considerable similarities to the generator 1 described above. Nevertheless, a preferred embodiment of this generator 101 consists in that the length 1 of the generatrices of the side wall 103 is substantially equal to four and a half times the diameter d. In addition, in the present embodiment a cylindrical casing 112, integrally attached to the igniter-carrier 108, fits tightly round the wedging ring 111, the pyrotechnic charge 114, and the filtering grid 116. The cylindrical casing 112 thus corresponds to the combination of the tubular enclosure 12 and of the burstable cover 20 of the generator 1, since, on the one hand, it insulates the pyrotechnic charge 114 in a leakproof manner from the side wall 103 and, on the other hand, it closes off the nozzle 117. The aluminium wedging ring 111 is notched and therefore bears directly against the pyrotechnic charge 114, the latter being laid flat against the filtering grid 116, which is convex in relation to the said pyrotechnic charge 114. Advantageously, a porous cylindrical condenser 129 made, for example, with the aid of a winding of grids, is laid flat against the downstream part 105 of the tube 102. Finally, the pyrotechnic charge is chosen from the so-called "double-base" compositions or else from plastic-bonded pyrotechnic compositions based on an organic binder and at least one oxidizing filler, and is in the form of a block 123 perforated over its whole length with cylindrical channels 124 which are parallel to the axis of revolution of the generator 101. This block 123 has a geometry with nineteen channels 124 permitting, in a given volume, the presence of a larger quantity of pyrotechnic material than in the geometry described earlier.

The generator 1 according to the invention functions as follows. In the event of collision a signal emitted by a collision detector causes the igniter 7 to fire, igniting the ignition powder 10. The combustion gases of powder 10 cause the cap 9 to burst and come into contact with the pyrotechnic charge 14, thus resulting in the ignition of the charge 14. When the pressure in the upstream part 4 of the tube 2 reaches the bursting rating of the cover 20, the latter ruptures and the gases enter the diffuser 22 and escape through the holes 6 of the downstream part 5 of the tube 2 to inflate the protective side cushion. The functioning of a generator according to the invention employed for inflating a protective side cushion involves the combustion gases of the powder 10, which cause the bursting of the cap 9, surround the outer side surface 26 of the block 23 as well as the inner surfaces of the channels 24 and thus result in the ignition of the block 23 on all the contact surfaces, this being over the whole length of the block 23. Insofar as the web to be burnt "$e_r$" has been determined for this purpose as a function of the speed of combustion of the composition of which the block 23 consists, it is thus possible to ensure the complete combustion of the block 23 in less than 10 milliseconds without risk of explosion.

The functioning of the generator 101 according to the invention is similar. When the pressure in the upstream part 104 of the tube 101 reaches the bursting rating of the cylindrical casing 112 which shuts off the nozzle 117, this casing ruptures in the vicinity of the said nozzle 117 and the gases enter the downstream part 105 of the tube 102, pass through the porous condenser 129 and escape through the holes 106 to inflate the protective front cushion.

An essential advantage of the present invention lies in the fact that the manufacture of such a pyrotechnic generator of hot gases 1 or 101 is easy and inexpensive. To do this, the procedure is as follows, reference being made, by way of example, to the generator 1.

First of all, the cylindrical tube 2 is made, into which the nozzle 17 is slid through the upstream open end. The nozzle 17 is then fixed by crimping into the side wall 3, at the junction of the upstream part 4 and of the downstream part 5 of the tube 2. The filtering grid 16 is then introduced through the upstream open end and comes to bear against the covered nozzle 17. Next the tubular enclosure 12 containing the pyrotechnic charge 14 is inserted into the tube 2 through the upstream open end, and its end 15 comes to bear against the filtering grid 16. The wedging ring 11 is then introduced into the tube 2 through the upstream open end and is applied against the end 13 of the tubular enclosure 12. The igniter 7, which is inserted into the igniter-carrier 8, is then slid through the upstream open end into the tube 2, and the said igniter-carrier 8, which abuts against the wedging ring 11, is fixed by crimping in the upstream open end of the tube 2. Finally, the leakproof plug 21 is fixed by crimping in the downstream open end of the tube 2.

At the end of these stages a pyrotechnic generator for hot gases 1 according to the invention is thus formed and can be used to inflate a side cushion for protecting the occupants of a motor vehicle.

We claim:

1. Pyrotechnic generator of hot gases (1, 101), intended for motor vehicle safety, comprising a cylindrical tube (2, 102) which has a continuous side wall (3, 103) the length (L, 1) of which is at least two times greater than its external diameter (D, d), an igniter (7) and a pyrotechnic charge (14, 114), wherein
   i) said cylindrical tube (2, 102) is made of metal, said metal being sufficiently ductile to be capable of being crimped, said tube (2, 102) comprising a continuous upstream part (4, 104) and a downstream part (5, 105) provided with holes (6, 106), and having an upstream open end and a downstream open end,
   ii) an inner nozzle (17, 117) comprising a cylindrical component (18) which has a central orifice (19), said component (18) being fixed by crimping into the side wall (3, 103) at the junction of the upstream part (4, 104) and of the downstream part (5, 105) of the tube,
   iii) said pyrotechnic charge (14, 114) is placed in the upstream part (4, 104) and isolated from the continuous side wall by a cylindrical enclosure (12, 112),
   iv) said igniter (7) is inserted into an igniter-carrier (8, 108) fixed in the upstream open end of the tube (2, 102), and
   v) a leakproof plug (21) is fixed in the downstream open end of the tube (2, 102).

2. Generator according to claim 1, wherein the metal of said tube (2) comprises an extensibility greater than 20% of its length and a tensile strength greater than 400 MPa.

3. Generator according to claim 2 wherein, the downstream part (5) of the tube (2) forms a diffuser (22) included between said nozzle (17) which is shut off and said leakproof plug (21).

4. Generator according to claim 1 wherein said central orifice (19) of the inner nozzle (17) is shut off by a burstable cover (20).

5. Generator according to claim 1 wherein, a grid for filtering and supporting (16) the pyrotechnic charge (14) is placed between the cylindrical enclosure (12) and the inner nozzle (17).

6. Generator according to claim 1 wherein, a wedging ring (11) is placed between the igniter-carrier (8) and the cylindrical enclosure (12) so as to wedge the said enclosure (12) against a filtering grid (16).

7. Generator according to claim 1 wherein, the pyrotechnic charge (14) comprises a pyrotechnic composition which includes at least 30% of nitroglycerine by weight in a mixture of nitrocellulose and of nitroglycerine.

8. Generator according to claim 1 wherein, the pyrotechnic charge (14) comprises a plastic-bonded pyrotechnic composition which includes a silicone resin as binder and a mixture of ammonium perchlorate and of sodium nitrate as oxidizing filler.

9. Generator according to claim 1 wherein, the pyrotechnic charge (14) comprises a plastic-bonded pyrotechnic composition which includes a thermoplastic binder and an oxidizing filler based on ammonium nitrate.

10. Generator according to claim 7 wherein the said pyrotechnic charge (14) is in the form of a block (23) perforated with a plurality of channels (24) which are parallel to the axis (25) of said block (23) contained in the enclosure (12) which is itself placed between a wedging ring (11) and a filtering grid (16) so that said channels (24) are parallel to the axis of revolution of the tube (2).

11. Generator according to claim 10 wherein, the block (23) of pyrotechnic charge (14) has radial webs ($e_r$) to be burnt which are all identical, with a geometry permitting a simultaneous ignition by the inner surfaces of the said channels (24) and by the outer side surface (26) of the block (23).

12. Generator according to claim 11 wherein, in the same transverse plane, the centres of the peripheral channels of the block (23) are not all equidistant from the centre (25) of said block (23), but are distributed alternately on two different concentric circles (27, 28).

13. Process for the manufacture of a generator according to claim 1 which comprises the following steps:
   i) making a cylindrical tube (2, 102) of metal which is sufficiently ductile to be capable of being crimped, said tube (2, 102) comprising a continuous upstream part (4, 104) and a downstream part (5, 105) provided with holes (6, 106), and having an upstream open end and a downstream open end, and having a side wall (3, 103) the length of which is at least two times greater than its external diameter (D, d),
   ii) introducing through one of the open ends of said tube (2, 102), an inner nozzle (17, 117) comprising a cylindrical component (18) which has a central orifice (19),
   iii) fixing the nozzle (17, 117) by crimping into the side wall (3, 103) of the tube (2, 102), at the junction of the upstream part (4, 104) and of the downstream part (5, 105) of the tube (2, 102),
   iv) introducing into the tube (2, 102) a cylindrical enclosure (12, 112) containing the pyrotechnic charge (14, 114) as well as a wedging ring (11, 111) and a filtering grid (16, 116) through the upstream open end, and
   v) introducing an igniter (7) inserted into an igniter-carrier (8, 108) through the upstream open end, said igniter-carrier (8, 108) abutting against the wedging ring (11, 111) and being fixed in the upstream open end of the said tube (2, 102).

* * * * *